Inventor
H. J. B. Topp

Dec. 21, 1954   H. J. B. TOPP   2,697,517
APPARATUS FOR USE IN DRYING OR CLASSIFYING OR BOTH
DRYING AND CLASSIFYING LOOSE MATERIAL
Filed March 20, 1952   3 Sheets-Sheet 3

Inventor
H.J.B.Topp

United States Patent Office 2,697,517
Patented Dec. 21, 1954

2,697,517

APPARATUS FOR USE IN DRYING OR CLASSIFYING OR BOTH DRYING AND CLASSIFYING LOOSE MATERIAL

Hereward J. B. Topp, Mauriceville, Wairarapa, New Zealand

Application March 20, 1952, Serial No. 277,566

Claims priority, application New Zealand November 6, 1951

7 Claims. (Cl. 209—139)

The invention relates to the treatment of loose material having sufficient weight to fall rapidly or with appreciable speed under the influence of gravity, such as lime, coal, casein, meat meal and grain, and the invention has for its object to provide apparatus for use in dealing with the problem arising where the material contains moisture and has to be dried, or where the material is in an unequally divided state and has to be classified or graded, or where the material contains moisture and is in an unequally divided state and has to be both dried and classified or graded.

According to one aspect of the invention, apparatus for use in drying loose material containing moisture, comprises means for forming the material into a descending annular curtain, and means for directing a draught of air through the curtain.

According to another aspect of the invention, apparatus for use in separating and classifying loose unequally divided material, comprises means for forming the material into a descending annular curtain, means for directing a draught of air through the curtain so that the material is segregated into grades according to the varying sizes of the particles or pieces in the descending curtain, and means for separately collecting the segregated grades.

According to a further aspect of the invention, apparatus for use in drying, separating and classifying loose unequally divided material containing moisture, comprises means for forming the material into a descending annular curtain, means for directing a draught of air through the curtain so that moisture is extracted by the air from the material in the curtain and the material is separated into grades according to the varying sizes of the particles or pieces in the curtain, and means for separately collecting the dried and segregated grades.

By the use of apparatus constructed in accordance with the invention it is possible to overcome the difficulty usually experienced when it is desired to classify damp loose material containing a substantial proportion of coarse particles or pieces, as, in comparison with known forms of air separators, the apparatus of the invention is capable of dealing with such material quickly and without undue wear on the parts of the apparatus.

Moreover, by resort to the conception of forming the material into a descending annular curtain and directing a draught of air through the curtain, the bulk of the material acted on by the air passing through the curtain need be displaced by the air draught only a relatively short distance in order to obtain effective segregation. Hence the pressure imposed on the air to create the draught can be comparatively low.

The apparatus of the invention also has the advantage that the grades separated by the passage of the draught of air through the curtain can be collected in their descent and in a dry or substantially dry condition, so that the choking of pipes or ducts with damp material, as would be the case with known forms of air separators dealing with damp materials, is avoided.

Where in this specification I refer to a draught of air, it is to be understood that I include the use of a draught of any other suitable gaseous medium. It is also to be understood that the air or other gas used may be either at normal temperature or any other temperature according to requirements.

Two forms of apparatus constructed in accordance with the invention are illustrated in the accompanying drawings, in which.

It may here be mentioned that, apart from the question of drying, both forms of the apparatus illustrated are designed for classifying loose material (hereinafter referred to as the starting material) into at least two grades, namely a grade comprised of relatively coarse particles or pieces and a grade comprised of relatively fine particles or pieces, and, if desired, a third grade of dust-like form.

Figure 1:
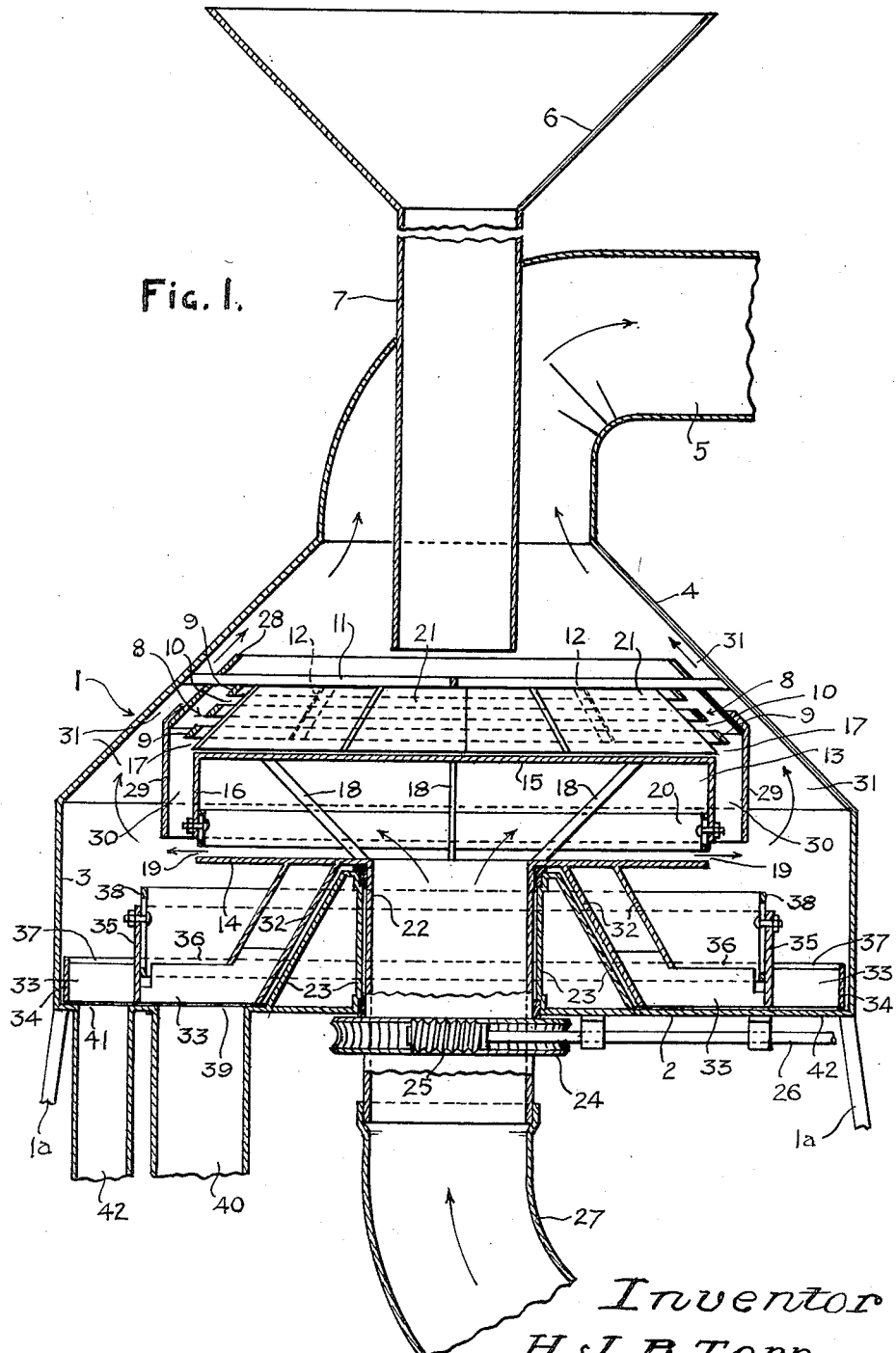
Figure 1 is a vertical sectional view, partly in elevation, of the first form of the apparatus.

The apparatus according to Figure 1 comprises a casing generally indicated at 1, the casing being supported on a suitable framework 1a and having a flat circular base 2 and a cylindrical side wall 3 surmounted by a truncated conical part 4 which is joined to an outlet pipe or offtake 5 of elbow form.

Above the casing 1 there is provided a hopper 6 or chute to which the starting material is supplied, the lower end of the hopper or chute communicating with a feed tube 7 which is arranged axially of the casing 1 so that it intersects the offtake 5, and the lower end of which terminates within the conical part 4 of the casing.

Beneath the lower end of the feed tube 7 there is provided what may be termed a basket generally indicated at 8. The basket comprises an annular side wall arranged at the same angle of inclination as the conical part 4 of the casing 1 and spaced inwardly thereof, the wall being made up of a series of hoops 9 arranged one above the other at intervals apart so as to leave gaps 10 between one hoop and the next. The uppermost one of the several hoops is fixed to a spider 11 extending across and secured to the conical part 4 of the casing 1, and the remaining hoops are supported from the uppermost hoop by means of ties 12. Hence, the several hoops are held stationary within the casing 1.

Arranged axially below the lowermost hoop of the basket 8 there is provided a rotatable air chest 13 the lower face of which is constituted by a disc 14, while the upper part is constituted by an inverted cup-like canopy comprised of a top plate 15 and a cylindrical side wall 16, the top plate constituting, in effect, the floor of the basket 8 and being spaced from the lowermost hoop 9 of the latter so as to leave an annular opening 17 at the bottom of the basket. The canopy is secured to the disc 14 by means of stays 18. The cylindrical side wall 16 of the canopy is spaced inwardly of the interior faces of the walls of the casing 1 and the lower edge of the said side wall terminates at a distance above the disc 14 so as to provide the air chest with a peripherally disposed opening 19. A vertically adjustable sleeve ring 20 may be provided on the lower edge portion of the side wall 16 of the canopy so that the size of the opening 19 may be varied.

For a purpose to be described, blades 21 are arranged within the basket 8 and are supported from the spider 11.

The disc 14 of the air chest 13 is provided with an axially disposed and downwardly extending hollow cylindrical spigot 22 which is journalled for rotation in a bush and plate assembly 23 on the base 2 and casing 1, and protrudes below the base 2. For rotating the spigot 22, and hence the air chest 13, the exposed part of the spigot is fitted with a worm-wheel 24 with which meshes a worm 25 on a shaft 26 driven from a suitable source of power such as an electric motor (not shown).

The lower end of the spigot 22 engages rotatably in the upper end of a conduit 27 to which air under pressure is supplied from a blower (not shown).

An annular shroud surrounds and is spaced from the hoops 9 of the basket 8 and the side wall 16 of the canopy of the air chest 13, and the shroud has a truncated conical upper part 28 of stiff material passing approximately midway through the space left between the hoops of the basket and the interior face of the conical part 4 of the casing 1, and also has a depending skirt 29 of rubber or similar flexible material enveloping the side wall 16 of the air chest 13. The part 28 of the shroud projects above the upper edge of the side wall of the basket 8 and the shroud is held in fixed position by the joining of the part 28 to the spider 11. The shroud 28, 29 acts to provide two annular ducts, namely, an inner duct 30 lying immediately next to and outwardly of the side wall of the basket 8 and the side wall 16 of the canopy of the air chest 13, and an outer duct 31 lying between the shroud and the inner faces of the casing 1. The purposes of these ducts will be explained later.

Plates 32 are secured to and depend from the disc 14 of the air chest, these plates supporting a series of radially directed blades 33 the lower edges of which lie close to the base 2 of the casing 1, while their outer edges are joined to a ring 34 lying close to the cylindrical part 3 of the casing. The blades 33 are joined to a cylindrical partition 35 arranged intermediate the inner and outer ends of the blades, the partition thus acting to provide an inner annular section 36 lying directly beneath the duct 30 and divided into compartments by the inner portions of the blades 33, and an outer annular section 37 lying directly beneath the duct 31 and divided into compartments by the inner portions of the blades. The section 36 is adapted to receive relatively coarse particles or pieces separated from the bulk of starting material, while the section 37 is adapted to receive relatively fine particles or pieces also separated from the bulk of starting material. The upper edge portion of the partition 35 may be fitted with a vertically adjustable sleeve ring 38 for varying the effective height of the partition.

The base 2 of the casing 1 is formed with at least one opening 39 lying in register with the section 36 and fitted with an outlet spout 40, the floor having at least one further opening 41 lying in register with the section 37 and fitted with an outlet spout 42.

The apparatus described operates as follows:

Air under pressure is supplied to the conduit 27 and passes upwardly through the hollow spigot 22 and into the air chest 13, thence passing as a radially directed draught out of the chest through the peripheral opening 19. At the same time, the worm-wheel 24 is driven by means of the worm 25 so as to cause rotation of the air chest 13 and the tray 33. Starting material is fed to the hopper 6 or chute and passes downwardly through the feed tube 7 into the basket 8. As the floor of the basket is constituted by the top plate 15 of the air chest 13 and the latter is rotating, the starting material resting on the said plate 15 will be brought into pressure contact with the stationary blades 21 which will act to plough the material towards the peripheral opening 17 at the bottom of the basket and cause the material to be expelled through this opening into the annular duct 30. If the rate of feed of the starting material into the basket 8 exceeds the capacity of the blades 21 to expel the material through the opening 17, the level of material in the basket will rise and the blades 21 will then act also to expel the surplus part of the material through the first gap 10 between adjacent hoops 9 of the basket and so on, so that this surplus part will again be delivered into the annular duct 30. If the rate of feed is such that the basket becomes overloaded, the part of the starting material representing the overload will spill from the upper edge of the basket and thus again find its way into the duct 30. Thus the starting material coming from the basket is formed into an annular curtain which falls by gravity through the duct 30 and then meets the draught of air issuing from the opening 19 in the air chest 13 and moving substantially at right angles to and passing through the falling curtain of starting material. The relatively large pieces forming part of the starting material, fall through the draught of air and are collected in the compartments of the section 36. The relatively fine pieces or particles forming another part of the starting material, are displaced by the draught of air radially outwards of the falling curtain but have sufficient weight then to fall through the draught so that they are collected in the compartments of the section 37. As the blades 33 rotate, the two grades of material collected in the compartments of the sections 36 and 37 are brought over the spouts 40 and 42 through which they fall for collection in separate containers, such as bags. If the descending curtain contains dust-like particles forming a third part of the starting material, these particles are entrained in the draught of air coming from the opening 19 and pass upwardly with the draught through the duct 31 and into the offtake 5. The dust-laden draught may be conducted by the offtake to suitable filtering means (not shown) acting to separate the dust from the air, thereby providing a third grade of material, or the offtake 5 may be joined to the conduit so that the air passing out through the offtake, whether it be dust-laden or not, is recirculated.

If the starting material contains moisture, then the draught of air passing through the descending curtain will act to extract the whole or part of such moisture, assuming that the air is not itself excessively moisture-laden, so that the classified material discharge through the spouts 40 and 42 will be in a dry condition or substantially so. The drying effect may be varied by pretreating the air, as by drying it and raising or lowering its temperature.

By making the skirt 29 of the shroud, of rubber or similar flexible material, the advantage is gained that should the material discharged from the basket 8 tend to block or choke the lower part of the duct 30, the skirt 29 will be free to expand and thus maintain a clear passage. The flexibility of the skirt will, moreover, tend to prevent finer particles or pieces in the descending curtain from adhering to the inner face of the skirt. The arrows in the drawing indicate the courses taken by the draught of air on its passage from the conduit 22 to the offtake 5.

In the embodiment described with reference to Figure 1, the upper one of the hoops 9 constituting the side wall of the basket 8, may be vertically adjustable to vary the effective depth of the basket. Moreover, if desired, the remaining hoops may be vertically adjustable to vary the width of the gaps 10 and opening 17.

Figure 2:
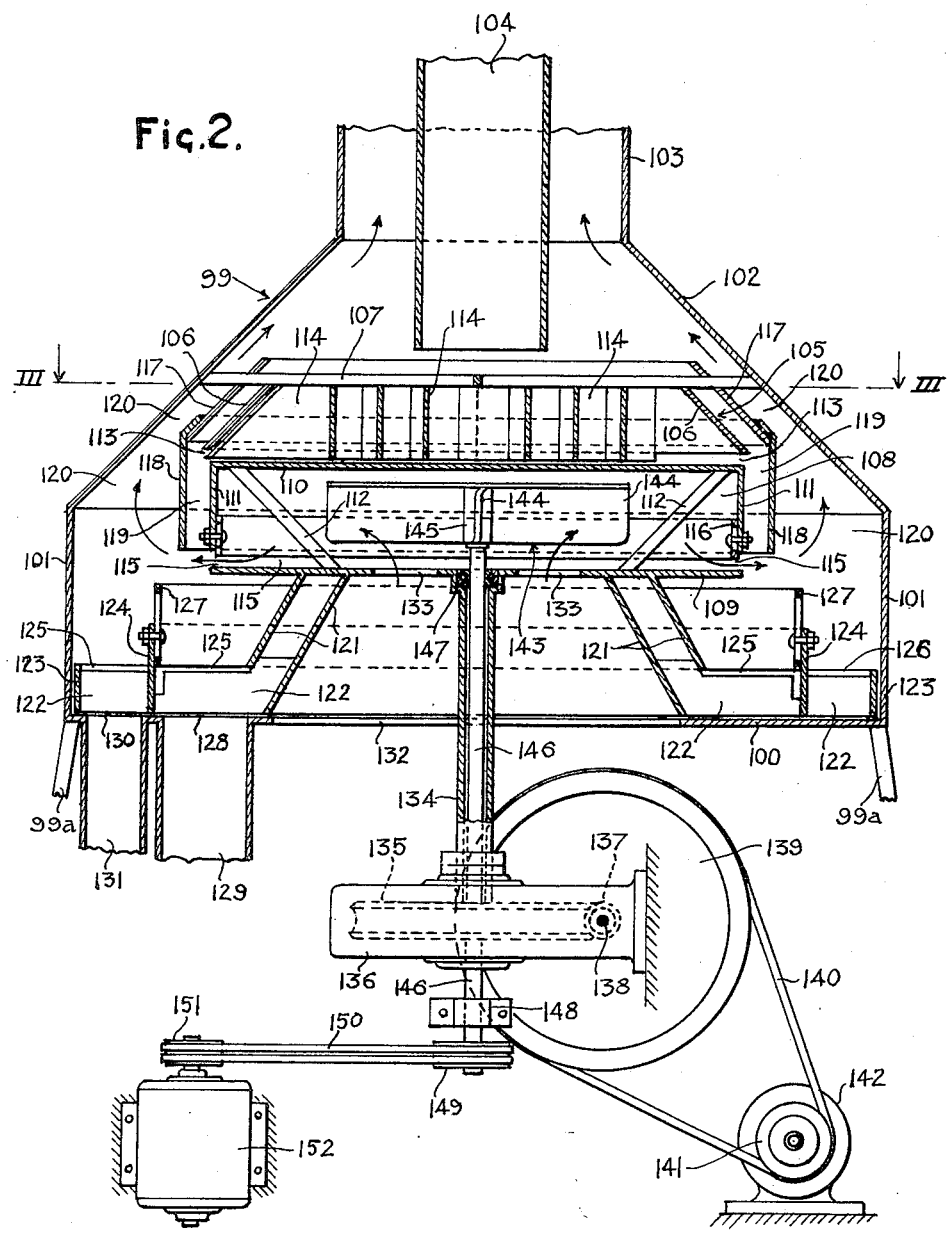
Figure 2 is a similar view of the second form of apparatus.
Figure 3:
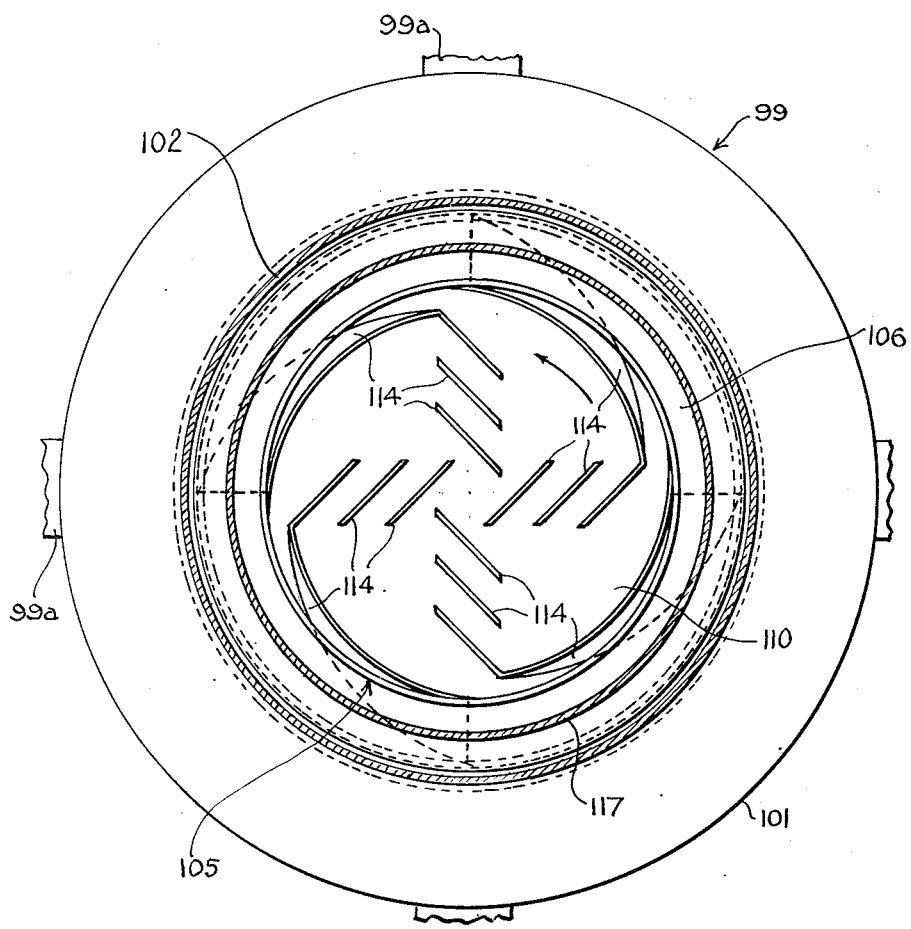
Figure 3 is a sectional plan view on the line III—III of Figure 2.

The apparatus illustrated in Figures 2 and 3 comprises a casing generally indicated at 99, the casing being supported on a suitable framework 99a and having a flat circular base 100 and a cylindrical side wall 101 surmounted by a truncated conical upper part 102 joined to an offtake 103.

A centrally disposed feed tube 104 passes through the offtake 103 and into the conical part 102 of the casing 99.

Beneath the lower end of the feed tube 104 there is provided what may be termed a basket generally indicated at 105. The basket comprises an annular side wall 106 arranged at the same angle of inclination as the conical part 102 of the casing 99 and spaced inwardly thereof, the said wall being attached to a spider 107 extending across and secured to the conical part of the casing.

Arranged axially below the side wall 106 of the basket there is provided a rotatable air chest 108 the lower face of which is constituted by a disc 109, while the upper part is constituted by an inverted cup-like canopy having a top plate 110 and a depending cylindrical side wall 111, the canopy being joined to the disc 109 by means of stays 112.

The top plate 110 constitutes, in effect, the bottom of the basket 105 and is spaced below the lower edge of the side wall 106 of the basket so as to leave a peripherally disposed opening 113, extending around the lower edge of the basket.

Within the basket 105 constituted by the side wall 106 and the top plate 110 of the air chest 108 there is provided a series of blades 114 which are secured to the spider 107. The arrangement and configuration of these blades are clearly depicted in Figure 4, the direction of rotation of the air chest 108 being indicated by the arrow in this figure.

The cylindrical side wall 111 of the canopy of the air chest is spaced inwardly of the interior faces of the walls of the casing 99 and the lower edge of the said side wall terminates at a distance above the disc 109 so as to provide the air chest with a peripherally disposed opening 115. A vertically adjustable sleeve ring 116 may be provided on the lower edge portion of the side wall of the canopy to permit the size of the opening 115 to be varied according to requirements.

An annular shroud surrounds and is spaced from the side wall 106 of the basket 105 and the side wall 111 of the canopy of the air chest 108, the shroud having a truncated conical upper part 117 which lies approximately midway between the interior face of the conical part 102 of the casing 99 and the side wall of the basket, and to which is attached a depending skirt 118 of rubber or like flexible material extending around the side wall 111 of the canopy of the air chest 108. The part 117 projects above the upper edge of the side wall 106 of the basket and is held in fixed position by means of the spider 107. The shroud 117, 118 acts to form two annular ducts, namely, an inner duct 119 lying immediately next to and outwardly of the side wall 106 of the basket and the side wall 111 of the canopy of the air chest, and an outer duct 120 lying between the shroud and the inner face of the casing 99.

Co-axially disposed plates 121 of truncated conical form are secured to and depend from the disc 109 of the air chest 108, these plates carrying a plurality of radially disposed blades 122 the lower edges of which lie close to the base 100 of the casing 99, while their outer ends are joined to a ring 123 lying close to the cylindrical part 101 of the casing. A cylindrical partition 124 is connected to the blades 122 at a position situated intermediate the inner and outer ends thereof, the partition thus acting to provide an inner annular section 125 lying directly beneath the duct 119 and divided into compartments by the inner portions of the blades, and an outer annular section 126 lying directly beneath the duct 120 and divided into compartments by the outer portions of the blades. The upper edge portion of the partition 124 may be fitted with a vertically adjustable sleeve ring 127 to permit the effective height of the partition to be varied according to requirements.

The base 100 of the casing 99 is formed with at least one opening 128 lying in register with the section 125 and to which an outlet spout 129 is connected, the base 100 being formed with at least one further opening 130 which lies in register with the section 126 and to which an outlet spout 131 is connected.

The base 100 of the casing 99 is formed with a centrally disposed aperture 132 and the disc 109 of the air chest 108 is formed with apertures 133 arranged above the aperture 132. Thus, air from the atmosphere can pass through the aperture 132 and then through the apertures 133 into the air chest 108.

For rotating the air chest 108 there is provided a hollow shaft 134 which is connected to the disc 109 and passes downwardly through the aperture 132 in the base 100 of the casing 99. This hollow shaft is keyed to a wormwheel 135 arranged in a housing 136 and in mesh with a worm 137 the shaft 138 of which is keyed to a pulley 139 driven by belting 140 from a pulley 141 on the rotor shaft of an electric motor 142.

The air chest 108 contains an impeller, generally indicated at 143, and made up of blades 144 secured to a hub 145 fixed to the upper end of a vertically arranged and centrally disposed shaft 146. This shaft passes freely through the hollow shaft 134, worm wheel 135 and housing 136 and is journalled for rotation, independently of the hollow shaft 134 in a bearing 147 carried by the disc 109 of the air chest 108 and in a second bearing 148 arranged below the housing 136. The exposed lower end portion of the shaft 146 is fitted with a pulley 149 driven by belting 150 from a pulley 151 on the rotor shaft of an electric motor 152.

In principle, the apparatus described with reference to Figures 2 and 3 operates in the same way as that described with reference to Figure 1.

On supply of current to the electric motors 142 and 152 the impeller 144 is rotated at a relatively high speed from the motor 152 through the pulley 151, belting 150, pulley 149 and shaft 146, while the air chest 108 and, with it, the tray 122, is rotated at a relatively low speed from the motor 141, through the pulley 151, belting 140, pulley 139, worm 137, wormwheel 135 and hollow shaft 134. The impeller 144 causes air from the atmosphere to be drawn through the apertures 132 and 133 into the air chest 108 and then forces the air as a radially directed draught through the peripheral opening 115 in the air chest.

Starting material supplied to the feed tube 104 falls into the basket 105, and the stationary blades 144, acting in conjunction with the rotating top plate 110 of the air chest 108, causes the material in the basket to be forced through the opening 113 at the bottom of the side wall 106 of the basket so that the starting material enters the duct 119 and falls by gravity as an annular curtain which is then acted on by the draught of air issuing from the opening 115 in the air chest. If the basket becomes overloaded, the excess material will spill over the upper edge of the basket and fall into the duct 119, thus forming part of the descending curtain. The apparatus then functions in exactly the same way as that described with reference to Figure 1, the relatively heavy pieces or particles in the descending curtain of starting material fall through the draught of air issuing from the opening 115 and being collected in the compartments of the section 125 and then being discharged through the outlet spout 129 under the action of the inner parts of rotating blades 122, and the relatively fine pieces or particles being displaced radially by the air draught and then descending for collection in the compartments of the section 126 from which they are discharged through the outlet spout 131 under the action of the outer parts of the blades, two grades of material thus being provided. Dust-like particles, if present in the starting material, are entrained in the draught of air issuing from the opening 115 in the air chest and passing upwardly through the duct 120 to the offtake 103, these particles being, if desired, separated from the exhaust air by filtration to give a third grade of the material.

In the embodiment according to Figures 2 and 3, instead of the side wall 106 of the basket 105 being constituted by single plate as shown, it may be made up of a series of hoops as in the constructions according to Figure 1. Alternatively, in both embodiments the side wall of the basket may be constituted by a single plate formed with perforations through which the starting material can pass, such perforations being additional to the peripherally disposed opening at the bottom edge of the basket.

In both embodiments, a plurality of outlet spouts may be provided for each of the sections 35, 36 (Figure 1) and 125, 126 (Figures 2 and 3), and instead of there being only two sections as shown, there may be provided three or more such annularly disposed sections so that the apparatus is then capable of segregating a correspondingly increased number of grades from the starting material.

What I do claim and desire to obtain by Letters Patent of the United States of America is:

1. Apparatus for use in separating and classifying loose unequally divided material, comprising a casing, a horizontally disposed circular plate mounted for rotation in the casing, means for directing the loose material on to the upper surface of said plate, means for causing the material to move to the peripheral edge of said plate so that the material falls from the said edge as an annular curtain, a cylindrical air chest arranged beneath said plate and formed with an annular opening, means for admitting air to the air chest and driving the air out of the chest through the said annular opening therein so that the draft of air issuing from the opening will pass cross-wise through the material in the falling curtain, a plurality of annular sections arranged within the casing below the air chest and at different distances from the axis of rotation of the circular plate, the inner one of said sections lying directly in line with the normal path of fall of the curtain of material, a discharge opening provided in the casing for each of the said annular sections, and means for causing parts of the material collected in the sections from the falling curtain to be propelled to said discharge openings.

2. Apparatus for use in separating and classifying loose unequally divided material, comprising a casing, a basket arranged within the casing, the basket including a stationary circular side wall and a rotatable circular base plate spaced below the side wall so as to form an annular opening in the basket, means for directing the loose material into the basket, means for rotating the base plate, stationary blades arranged within the basket and adapted, on rotation of the base plate, to propel the loose material in the basket to the said annular opening so that the material then falls as an annular curtain from the basket, a cylindrical air chest arranged beneath the basket and formed with an annular opening, means permitting air under pressure to be supplied to the air chest so that the air will escape as an annular draft through the annular opening in the air chest and pass cross-wise through the falling curtain of loose material to thereby radially displace part of the material in the curtain, annular sections arranged beneath the air chest and adapted to receive different parts of the loose material from the falling curtain after the latter has been acted on by the air draft, separate discharge openings in the said sections, and means for moving the material collected in the sections to the said discharge openings.

3. Apparatus for use in separating and classifying loose unequally divided material, comprising a casing having an air outlet, a basket arranged within the casing and including a fixed circular side wall and a rotatable circular base plate spaced below the side wall so as to provide the basket with an annular opening, means for directing the loose material into the basket, stationary blades arranged within the basket and so disposed that on rotation of the base plate they act to propel the loose material in the basket to the annular opening in the latter, the material thereby falling from said opening as an annular curtain, an air chest arranged beneath the basket and including a circular side wall joined to and depending from the base plate of the basket and a disc supported from the base plate and spaced below the lower edge of the side wall so as to provide the air chest with an annular opening, means for rotating the said disc with consequent rotation of the side wall of the air chest and the base plate of the basket, means permitting air under pressure to be supplied to the air chest so that the air will escape radially as an annular draft through the annular opening in the air chest and will move substantially at right angles to the direction of fall of the curtain of material, thereby radially displacing part of the material in the curtain, a series of annular sections provided within the casing and situated below the air chest, said sections being arranged one outside the other so that they lie at different distances from the center of rotation of the air chest and thus are adapted to receive different grades of material from the falling curtain after the latter has been acted on by the air draft, a discharge opening provided in the casing for each of the said annular sections, and blades arranged in the sections and adapted to rotate with the air chest so as to cause the material in the sections to be moved to said discharge openings.

4. Apparatus as claimed in claim 3 and including a shroud arranged within the casing and surrounding but spaced from both the annular opening in the basket and the side wall of the air chest.

5. Apparatus as claimed in claim 3 and wherein the side wall of the basket is composed of spaced hoops.

6. Apparatus for use in separating and classifying loose unequally divided material, comprising a casing having an air outlet, a basket arranged within the casing and including a fixed circular side wall and a rotatable circular base plate spaced below said side wall so as to provide the basket with an annular opening in its lower part, means for directing the loose material into the basket, stationary blades arranged within the basket and adapted to propel the material in the basket towards the annular opening therein when the base plate is rotated, the material thereby falling from the basket as an annular curtain, a cylindrical wall joined to and depending from the base plate, a disc supported from the base plate and spaced below the lower edge of said cylindrical wall, the base plate, cylindrical wall and disc together forming an air chest situated below the basket and having an annular opening therein, means for rotating the disc with consequent rotation of the cylindrical wall and base plate, air inlet openings in the disc, an impeller mounted for rotation within the air chest, means for driving the impeller so that it will rotate at a greater speed than the air chest, thereby inducing air into the chest through the said inlet openings and driving the air out of the chest through the annular opening therein so that the air issues as a radially directed annular draft passing cross-wise through the curtain of material falling from the basket, said draft causing part of the material in the curtain to be displaced radially during its descent, a series of annular sections provided within the casing and situated below the air chest, said sections lying at different distances from the axis of rotation of the air chest and being adapted to receive different parts of material from the falling curtain, a separate discharge opening provided in the casing for each annular section, and blades arranged in the sections and connected to the air chest for rotation therewith, said blades acting to propel the material in the sections to the discharge openings.

7. Apparatus as claimed in claim 6 and including a shroud arranged within the casing and surrounding but spaced from both the annular opening in the basket and the cylindrical wall of the air chest.

References Cited in the file of this patent

UNITED STATES PATENTS

| Number | Name | Date |
|---|---|---|
| 2,003,141 | Dorfan | May 28, 1935 |
| 2,009,505 | Weaver | Nov. 16, 1937 |